United States Patent
Peterson et al.

(10) Patent No.: US 6,616,886 B2
(45) Date of Patent: Sep. 9, 2003

(54) METHOD AND APPARATUS FOR REDUCING THE THICKNESS OF A SKIN FORMED ON A SLAB OF POLYURETHANE FOAM

(75) Inventors: Bruce W. Peterson, Fort Smith, AR (US); Theodore J. Bartsch, Fort Smith, AR (US)

(73) Assignee: Foamex L.P., Linwood, PA (US)

( * ) Notice: Subject to any disclaimer, the term of this patent is extended or adjusted under 35 U.S.C. 154(b) by 0 days.

(21) Appl. No.: 09/773,206

(22) Filed: Jan. 31, 2001

(65) Prior Publication Data

US 2002/0180084 A1 Dec. 5, 2002

(51) Int. Cl.⁷ .......................... B29C 44/20; B29C 44/34
(52) U.S. Cl. .................. 264/415; 264/45.5; 264/45.8; 264/48; 264/51; 264/102; 425/4 C; 425/135
(58) Field of Search .................. 425/4 C, 817 C, 425/135; 264/51, 45.8, 415, 48, 45.5, 102

(56) References Cited

U.S. PATENT DOCUMENTS

| | | |
|---|---|---|
| 2,929,793 A | 3/1960 | Hirsh |
| 3,181,199 A | 5/1965 | Voelker |
| 3,240,846 A | 3/1966 | Voelker |
| 3,305,381 A | 2/1967 | Van Wagenen |
| 3,312,760 A | 4/1967 | Berner |
| 3,345,439 A | 10/1967 | Everhard et al. |
| 3,736,081 A | 5/1973 | Yovanovich |
| 3,816,233 A | 6/1974 | Powers |
| 3,872,199 A | 3/1975 | Ottinger |
| 4,216,177 A | 8/1980 | Otto |
| 4,255,105 A | 3/1981 | Hoffmann et al. |
| 4,275,024 A | 6/1981 | Luaces |
| 4,783,287 A | 11/1988 | Eichberger et al. |
| 5,409,649 A | 4/1995 | Pool |
| 5,509,795 A | 4/1996 | Near et al. |
| 5,786,000 A | 7/1998 | Beiner |
| 5,804,113 A | 9/1998 | Blackwell et al. |

FOREIGN PATENT DOCUMENTS

WO    WO 00/47384    8/2000

*Primary Examiner*—Allan R. Kuhns
(74) *Attorney, Agent, or Firm*—Connolly Bove Lodge & Hutz LLP

(57) ABSTRACT

Methods and apparatus for eliminating or reducing a surface skin when producing a flexible polyurethane foam slab are disclosed. The top surface of the chemically reactive polyurethane foaming mixture is heated during and/or after the foaming mixture expands. The heating preferably is conducted so as to prevent a significant temperature gradient from forming between the internal temperature of the foaming mixture and the top surface of that mixture. Preferably, heat is applied so as to heat from the top surface of the foaming mixture in an escalating fashion to higher temperatures as the foam is conveyed along a conveying path away from the foaming mixture dispensing device.

19 Claims, 2 Drawing Sheets

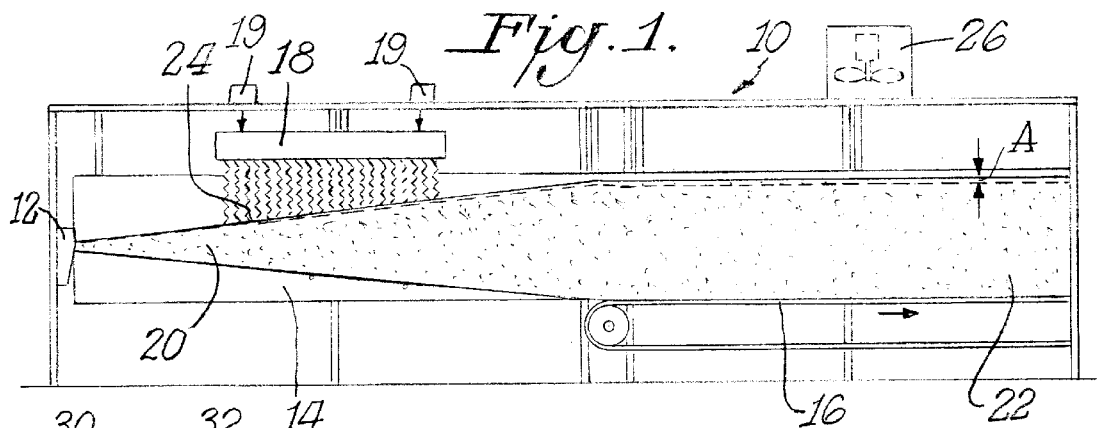
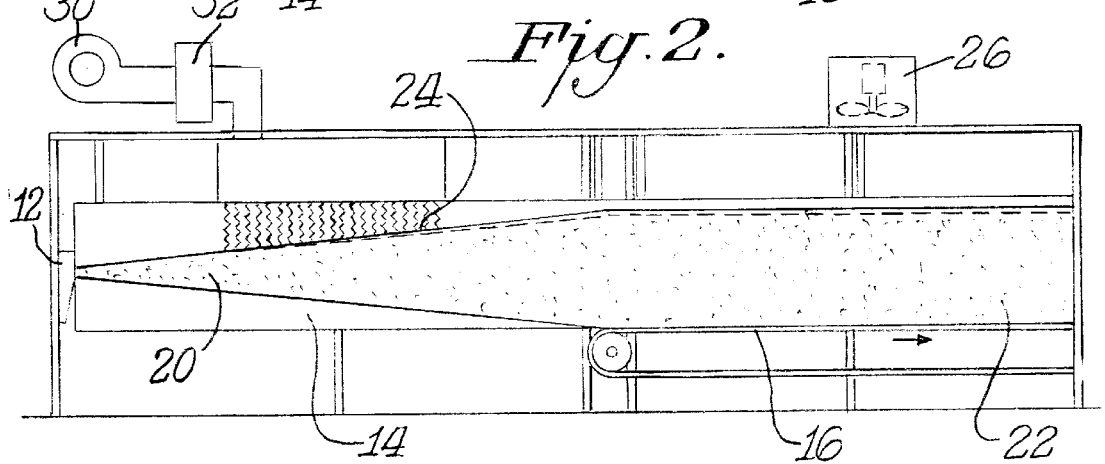
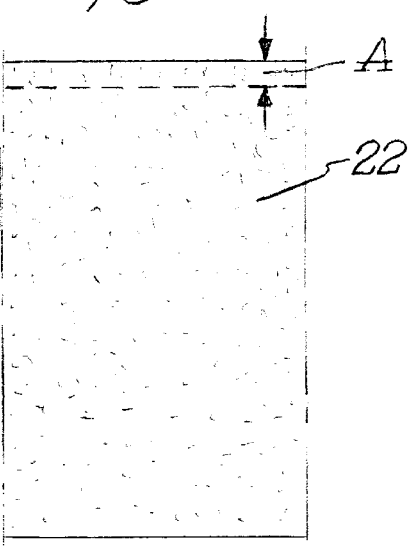

METHOD AND APPARATUS FOR REDUCING THE THICKNESS OF A SKIN FORMED ON A SLAB OF POLYURETHANE FOAM

BACKGROUND OF THE INVENTION

The present invention relates to the production of a skinless or low skin flexible polyurethane foam slab using a continuous foaming process.

During the continuous production of free rise flexible slabstock polyurethane foam, a dense skin forms on the top surface of the foam slab. The skin varies in thickness depending upon the chemical formulation used to form the foam, the environmental conditions and other processing parameters. The top skin forms on free-rise polyurethane flexible foams formed using various processing equipment, including, inter alia, MAXFOAM™, VARIMAX™, VARIABLE PRESSURE FOAMING (VPF™), FOAM-ONE™, EDGEMASTER™, conventional direct laydown, and $CO_2$ processing equipment (i.e., Novaflex™, CarDio™, and Beamech CO-2™).

Depending upon the formulation, the top skin that forms on the polyurethane slab has a high density and a thickness from 0.01 to 0.25 inches. For many end use applications, the skin must be cut away and discarded as waste, thus resulting in loss of chemicals that could have produced useful polyurethane foam. Depending upon the exact thickness and density of the top skin formed, the formulation chemicals present in the skin typically are sufficient to have produced 0.1 to 2.5 inches of additional foam height. This skin thus represents a significant yield loss in the foaming process.

Apparatus and methods have been proposed in attempts to eliminate the top skin, but they have not proved successful for forming flexible polyurethane slabstock foam. One common method is to apply a paper or polyethylene sheet to the top surface of the foam during the early stages of the foam forming chemical reaction (PINTOMAX™). Using this PINTOMAX™ process, skin formation may be partly avoided because the sheet forms a barrier between the foam and the atmosphere above the foam. However, the sheet also prevents gases generated during the foaming process (such as $CO_2$, methylene chloride, acetone, pentane or other auxiliary blowing agents) from escaping without damaging the foam cell structure and forming splits and voids on the top surface of the slab.

U.S. Pat. No. 3,816,233 discloses a method for forming a polyurethane sheet with different properties on its top and bottom surfaces produced by differentially heating (or cooling) those surfaces during foam expansion. The patent seeks a foam with a "porous skin". In the preferred embodiment, a top cover sheet placed on the top surface of the foaming mixture is heated with infrared radiation from lamps to temperature from 25° to 100° F. above the temperature of the bottom surface of the foaming mixture. The preferred heating temperature is 175° F. to 200° F. for the heated side and 80° F. to 120° F. for the unheated (or cooled) side. The foam is then compressed to a desired thickness and the cover sheet is removed. The patent thus seeks to form a region of higher density, like a skin on the foam sheet surface, and uses top heating to accomplish this result.

U.S. Pat. No. 3,345,439 describes forming rigid thermoplastic structures. The patent explains that maintaining the temperature of the walls of the structure in which the foam is produced affects the thickness of the skin that is formed on the surface of the material. Lower temperatures produce thicker unexpanded skins. According to the patent, the rising foam is passed between heating platens, and in order to achieve a more gradual expansion, one of the heating platens may be angled such that the heating field has a greater intensity at the leading edge than at the trailing edge. The patent relates only to rigid foams.

Published patent application WO 00/47384 discloses a method and apparatus for producing skinless flexible polyurethane slabstock foam in continuous or molding processes in which the foaming occurs in a closed space with a gas saturated atmosphere. The preferred gas in the gas saturated atmosphere is carbon dioxide, or a mixture of carbon dioxide with other gases. The application suggests it may also be advisable to heat the surface of the enclosure in which foaming occurs to prevent undesired condensation thereon.

Perhaps similar to WO 00/47384, U.S. Pat. 5,804,113 discloses a method for producing slabstock polyurethane foam under controlled pressure and temperature conditions. Free rise expansion of the foaming ingredients takes place within a hermetically enclosed space. The temperature in the enclosed space is controlled by introducing heated air. The air temperature range is from 10° C. to 75° C., preferably 20° C. to 50° C. (Col. 5, lines 28–29). The patent does not discuss foam skin formation or methods for eliminating such skin.

The prior art does not teach or suggest a method and apparatus for preventing or reducing the skin formation on a flexible polyurethane slabstock foam without additional gases or foam-forming ingredients or extraneous films. Nor does the prior art teach or suggest a method and apparatus for preventing or reducing the skin formation on a flexible polyurethane slabstock foam produced on an open conveyor.

SUMMARY OF THE INVENTION

A method for reducing or eliminating a surface skin when producing a flexible polyurethane foam slab includes the steps of: (a) feeding a chemically reactive polyurethane foaming mixture into a region in which foaming expansion occurs, and (b) heating the top surface of the polyurethane foaming mixture during foaming expansion and/or after such expansion. Preferably, heat is applied only as such foaming expansion occurs.

The chemically reactive polyurethane foaming mixture defines an internal temperature as it expands. The internal temperature escalates as the foaming mixture is conveyed away from the feeding zone of the dispensing device. Preferably, the heating is conducted so as to prevent a significant temperature gradient from forming between the internal temperature and the temperature measured at the top surface of the polyurethane foaming mixture. Heating the top surface to a temperature within about±50° F. of the internal temperature of the foaming mixture has produced satisfactory results for most polyurethane foams.

Most preferably, the top surface of the polyurethane foaming mixture is heated to a temperature in the range of about 140° F. to 350° F. Excellent results have been obtained by heating to temperatures in the range of about 230° F. to 260° F. The preferred temperature is dependent upon the chemical formulation, the processing parameters and the ambient conditions during the process. Heating may also be applied in an escalating fashion, such that the top surface of the foaming mixture is heated to a greater degree as expansion occurs and as the foaming mixture is conveyed along a conveying path away from the dispensing device.

The heating may be supplied by one or a combination of radiant heat lamps, radiant heating panels, by heated gas, preferably air, or other heating sources introduced into the region in which foaming expansion occurs, and that are determined to be appropriate for the foaming chemical formula, process conditions and space limitations to maximize the benefit of skin density reduction. The heat may be applied from the region immediately adjacent to the dispensing device and to a region up to approximately 200 feet downstream and away from the dispensing device. For VARIMAX™ foaming equipment, for example, the heat may be applied to the surface of the foaming mixture starting at the trough and extending up to 200 feet downstream from the trough. For conventional foaming equipment in which the dispensing device does not include a trough, the heat may be applied to the surface of the foaming mixture within about twenty feet after the foaming mixture is laid onto a fall plate or conveyor and heating may be continued up to 200 feet downstream from the dispensing device.

The invention further comprises an apparatus for producing a skinless or low skin flexible polyurethane foam slab, which may have a trough or a dispensing device into which a chemically reactive polyurethane foaming mixture is introduced, a fall plate onto which the foaming mixture is fed from the trough or dispensing device, and a conveyor for conveying the expanded foam away from the fall plate along a conveying path. The apparatus further includes a heating source for heating a top surface of the chemically reactive polyurethane foaming mixture during and/or after foam expansion.

Most preferably, the heating source is a radiant heating panel or a series of radiant heating panels. The radiant heating panels may be mounted for tilting movement with relation to the conveying path. Preferably, the panels are tilted so that each panel is spaced farther from the top surface of the chemically reactive polyurethane foaming mixture at a first position or zone along the conveying path and closer to the top surface of the polyurethane foaming mixture at a second position or zone along the conveying path. Alternatively, the heating source is a heated gas blanket, wherein preferably the gas is air, including but not limited to, ambient air drawn from the atmosphere and heated by heating coils.

DESCRIPTION OF THE FIGURES

FIG. 1 is a schematic view in side elevation of an apparatus for the continuous production of polyurethane foam slabs according to the present invention;

FIG. 2 is a schematic view in side elevation of an alternate embodiment of an apparatus for the continuous production of polyurethane foam slabs according to the present invention;

FIG. 3 is a fragmental view in side elevation of a polyurethane foam slab produced according to the method of the present invention.

DESCRIPTION OF THE PREFERRED EMBODIMENTS

Figure 4:
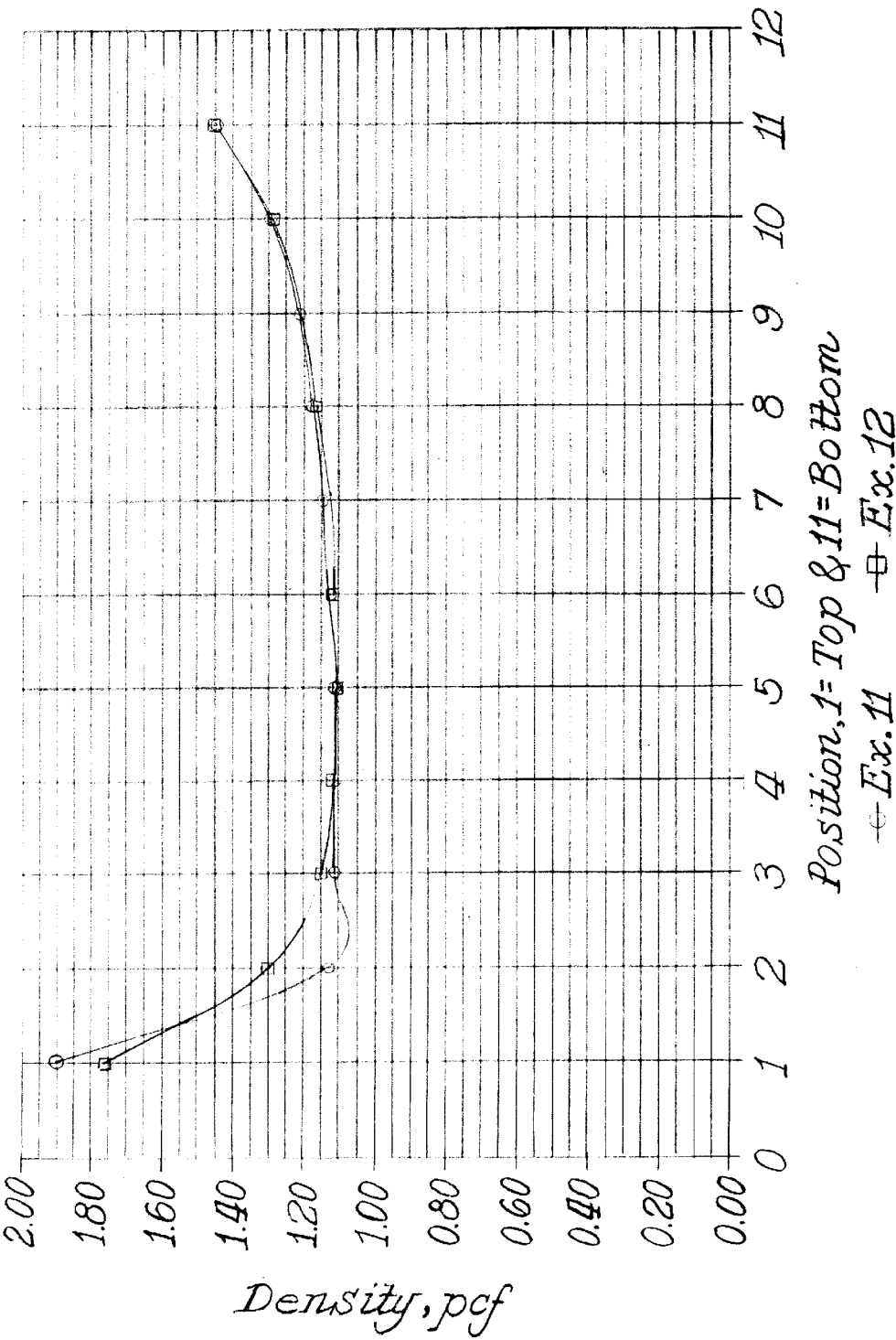
FIG. 4 is a graph of polyurethane foam density versus position from top to bottom in a slab of foam.

Referring to FIG. 1, there is shown a first apparatus 10 for continuously producing flexible polyurethane foam slabstock. A liquid chemically reactive polyurethane foam forming mixture is fed from a mixer (not shown) into the bottom of a trough 12 and allowed to expand upwardly. From the trough 12, the foam foaming mixture spills out from the top lip of the trough and down onto angled fall plate 14. The foam forming mixture continues to expand as it is conveyed away from the trough 12. It is left to polymerize while it moves along a conveying path defined by conveyor 16.

Preferably, the bottom and sides of the fall plate 14 and conveyor 16 are covered with one or more paper sheets or films continuously fed from rolls (not shown). The papers or films form a moving channel along the fall plate 14 and conveyor 16, and provide a barrier between the foaming mixture and the surfaces of the fall plate and conveyor. The polyurethane mixture is allowed to freely expand vertically and fall within the moving channel and downwards along the fall plate 14 and the conveyor 16 until achieving the free rise foam height of the foam.

When the polyurethane foam-forming mixture freely expands without applied heat, the upper surface of the foam will form a skin of a dense layer of foamed polyurethane material. The skin varies in thickness depending upon the chemically reactive foaming mixture and processing parameters. Hotter foaming reactions produce foams with thicker skins. The skin represents a significant yield loss.

Heat source 18, a radiant heat panel, heats the top surface 24 of the foam forming mixture 20 as the mixture expands and is conveyed down the fall plate 14. The fall plate 14 generally is about 20 to 25 feet long. The heat is applied to heat the top surface 24 of the mixture to heat the top surface to a temperature in the range of 140° F. to 350° F., preferably 230 to 260° F., which is at or near the internal temperature of the expanding foam-forming mixture for a given polyurethane foam.

In a most preferred embodiment, the radiant heat panel is mounted for tiltable movement by air cylinders and pistons 19 above the fall plate 14. The heating intensity on the top surface 24 of the foaming mixture may then be varied by tilting the panel so that a portion is closer to the fall plate 14 and top surface 24 of the foaming mixture. In this way, the heat applied to the surface 24 may increase as the foaming mixture is conveyed away from the trough 12 along the fall plate 14 so as to better match the escalating internal temperature of the foaming mixture. Temperature gradients between the top surface 24 of the foaming mixture and the internal temperature of the foaming mixture are believed to cause skin formation on the top surface of the slabstock foam.

As the foam continues to rise, it is carried along a conveying path by conveyor 16. Gases expelled during the foaming reaction are exhausted from the apparatus through blower 26. The apparatus need not be and preferably is not enclosed, but is open to the atmosphere.

As shown in FIG. 3, top zone A on the slab 22 of polyurethane foam represents the increased foam yield achieved by reducing or eliminating the skin on the top surface of the slab. It has been found that a full scale foam production will yield a height gain of 0.1 to 2.5 inches of more foam without adding additional foaming chemicals.

An alternate embodiment of the apparatus of the invention is shown in FIG. 2. Like elements have the same reference numbers as those shown in FIG. 1. In this alternate embodiment, the heat source comprises a blower 30 and heating element 32 for heating a gas, preferably air. The heated gas is directed to the top surface of the expanding reacting foam mixture to selectively heat the surface to reduce or eliminate a temperature gradient between the internal temperature of the foaming mixture and the temperature at the top surface 24. For this alternate embodiment, at least the region in which the heated gas is directed to the top surface 24 of the foam mixture should be enclosed for heating efficiency, particularly the region immediately adjacent the dispensing device to a region up to about 200 feet away from the dispensing device.

In the most preferred embodiment, the foaming mixture is allowed to expand for a predetermined distance away from the dispensing device and along the conveying path before heat is applied to the top surface. In FIGS. 1 and 2, the heating source 18 or 30, 32 respectively is shown spaced apart a distance from the trough 12. It has been found that for some foams it is preferable to partially expand the foaming mixture before applying heat to achieve the best reduction of skin formation on the polyurethane slabstock foam. In a preferred embodiment, the foaming mixture was conveyed away from the dispensing device for about 20 feet before heat was applied to the top surface of the foaming mixture.

EXAMPLES

Flexible polyurethane foam samples were prepared on a laboratory scale according to Examples 1–10 as shown in Table I. Example 1 was the control, and the foaming mixture in Example 1 was not heated. The foam of Example 2 was heated with hot air from a hot air gun. The foam of Example 3 was heated in an oven. Foams in Examples 4–10 were heated with a radiant heat panel positioned at varying distances from the top surface of the foaming mixture. The foams of Examples 2–4 were heated before the mixture reached cream time. The foams of Examples 2 and 3 were heated after the foam reached full rise height. The foams of Examples 4–10 were heated until the top surface of the sample reached 240° F.

The polyurethane formulations and results of the heating experiments are shown in Table I.

TABLE II (parts A and B).
Comparing Foam Densities versus position

| Example | 11 | 12 |
|---|---|---|
| 3022 polyol | 100.0 | 100.0 |
| Water (total) | 5.5 | 5.5 |
| L620 | 1.0 | 1.0 |
| TD 33 | 0.12 | 0.12 |
| C 29 | 0.18 | 0.18 |
| TDI | | |
| parts | 68.1 | 68.1 |
| index | 110 | 110 |
| cream time (sec.) | 22 | 22 |
| rise time (sec.) | 100 | 100 |
| distance from heat source (in.) | n/a | 13 |
| heating time (sec.) | n/a | 15 |
| density | | |
| top skin | 1.90 | 1.76 |
| foam | 1.13 | 1.12 |
| bottom skin | 1.45 | 1.46 |
| foam weight in cup (g) | 18.1 | 20.9 |
| air flow (ft3/min) | 6.10 | 6.15 |
| 25% CFD (psi) | 0.452 | 0.437 |

TABLE I

Comparison of heating time and heating type on foam skin formation

| Example | 1 | 2 | 3 | 4 | 5 | 6 | 7 | 8 | 9 | 10 |
|---|---|---|---|---|---|---|---|---|---|---|
| 3022 polyol | 100.0 | 100.0 | 100.0 | 100.0 | 100.0 | 100.0 | 100.0 | 100.0 | 100.0 | 100.0 |
| Water (total) | 5.5 | 5.5 | 5.5 | 5.5 | 5.5 | 5.5 | 5.5 | 5.5 | 5.5 | 5.5 |
| L620 | 1.0 | 1.0 | 1.0 | 1.0 | 1.0 | 1.0 | 1.0 | 1.0 | 1.0 | 1.0 |
| TD 33 | 0.12 | 0.12 | 0.12 | 0.12 | 0.12 | 0.12 | 0.12 | 0.12 | 0.12 | 0.12 |
| C 29 | 0.18 | 0.18 | 0.18 | 0.18 | 0.18 | 0.18 | 0.18 | 0.18 | 0.18 | 0.18 |
| TDI | | | | | | | | | | |
| parts | 68.1 | 68.1 | 68.1 | 68.1 | 68.1 | 68.1 | 68.1 | 68.1 | 68.1 | 68.1 |
| index | 110 | 110 | 110 | 110 | 110 | 110 | 110 | 110 | 110 | 110 |
| cream time (sec) | 18 | — | — | 20 | 19 | 19 | 20 | 19 | 19 | 18 |
| rise time (sec) | 90 | — | 97 | 92 | 93 | 94 | 100 | 97 | 96 | 95 |
| heating type | none | hot air | oven | RP | RP | RP | RP | RP | RP | RP |
| distance from heat (inch) | n/a | n/a | n/a | 25 | 25 | 25 | 25 | 21 | 17 | 13 |
| time elapsed after adding TDI before heat applied (sec) | n/a | 15 | 15 | 15 | 28 | 33 | 38 | 28 | 28 | 28 |
| Ending surface temperature (° F.) | n/a | 267 | 254 | 240 | 240 | 240 | 240 | 240 | 240 | 240 |
| Heating time (sec.) | n/a | 85 | 85 | 45 | 37 | 32 | 35 | 27 | 24 | 12 |
| Density (pcf) | | | | | | | | | | |
| top skin | 2.13 | 2.01 | 1.76 | 1.88 | 1.86 | 1.85 | 2.00 | 1.81 | 1.77 | 1.75 |
| % loss | n/a | 5.63 | 17.37 | 11.74 | 12.68 | 13.15 | 6.10 | 15.02 | 16.90 | 17.84 |
| foam | 1.11 | 1.10 | 1.08 | 1.10 | 1.10 | 1.07 | 1.10 | 1.10 | 1.10 | 1.08 |
| % loss | n/a | 0.90 | 2.70 | 0.90 | 0.90 | 3.60 | 0.90 | 0.90 | 0.90 | 2.70 |
| bottom skin | 1.45 | 1.51 | 1.50 | 1.52 | 1.47 | 1.43 | 1.47 | 1.52 | 1.55 | 1.49 |
| % increase | n/a | 4.14 | 3.45 | 4.83 | 1.38 | 1.38 | 1.38 | 4.83 | 6.90 | 2.76 |
| foam weight in cup (g) | 22.1 | 22.6 | 26.6 | 23.2 | 23.0 | 21.7 | 20.2 | 21.3 | 29.4 | 21.0 |
| Air flow (ft$^3$/min) | 5.76 | 5.58 | 6.15 | 5.99 | 5.60 | 5.85 | 5.63 | 5.96 | 6.00 | 6.05 |
| 25% CFD (psi) | 0.425 | 0.418 | 0.408 | 0.414 | 0.418 | 0.409 | 0.477 | 0.411 | 0.412 | 0.414 |

L620 is a silicone surfactant from Crompton.
TD 33 is an amine catalyst from Huntsman.
C 29 is a tin catalyst from Goldschmidt.

TABLE II-continued (parts A and B).
Comparing Foam Densities versus position

| Ex. zone | 11 density | Ht. | 12 density | Ht. |
|---|---|---|---|---|
| top 1 | 1.90 | 0.988 | 1.76 | 0.988 |
| 2 | 1.13 | 0.855 | 1.3 | 0.855 |
| 3 | 1.11 | 0.918 | 1.15 | 0.918 |
| 4 | 1.11 | 0.921 | 1.12 | 0.921 |
| 5 | 1.12 | 0.919 | 1.11 | 0.919 |
| 6 | 1.13 | 0.924 | 1.12 | 0.924 |
| 7 | 1.15 | 0.921 | 1.13 | 0.921 |
| 8 | 1.18 | 0.913 | 1.17 | 0.913 |
| 9 | 1.22 | 0.910 | 1.21 | 0.889 |
| 10 | 1.30 | 0.889 | 1.29 | 0.889 |
| 11 | 1.45 | 0.911 | 1.46 | 0.911 |
| ave. 1–11 | 1.25 | | 1.26 | |
| ave 2–11 | 1.19 | | 1.21 | |
| ave 2–10 | 1.16 | | 1.18 | |
| total height (in) | | 10.069 | | 10.358 |

FIG. 4 is a graph depicting density versus position for the foams of Examples 11 and 12. As can be seen from the data in Table II, which is represented graphically in FIG. 4, the heating applied to the top surface of the foaming mixture in Example 12 led to a decrease in the foam skin formation, a higher rise height and an increase in the amount of usable foam produced. The heating did not adversely affect the remaining foam at the central and bottom positions. Examples 11 and 12 showed equivalent densities at these positions.

Those skilled in the art will recognize numerous variations and modifications that can be made to the present invention without departing from the spirit or scope of the applicants' invention. Accordingly, the invention is not to be limited by the preferred embodiments but should be measured only by the following claims and their equivalents.

We claim:

1. A method for reducing or eliminating a surface skin when producing a flexible polyurethane foam slab, comprising the steps of:
   (a) feeding a chemically reactive polyurethane foaming mixture into a region in which foaming expansion occurs wherein the chemically reactive polyurethane foaming mixture defines an internal temperature and defines a temperature at its top surface during its foaming expansion; and
   (b) heating the top surface of the polyurethane foaming mixture to a temperature in the range of about 230 to 260° F. (110 to 128° C.) for at least a part of the time during which the mixture expands to form the polyurethane foam slab.

2. The method of claim 1, wherein the heating is conducted in an escalating fashion such that the temperature of the top surface of the polyurethane foaming mixture is heated to a higher temperature as it is conveyed in the region in which foaming expansion occurs along a conveying path away from a dispensing device from which the foaming mixture was fed.

3. The method of claim 2, wherein the chemically reactive polyurethane foaming mixture defines escalating internal temperatures during its foaming expansion as the mixture is conveyed through the region in which foaming expansion occurs, and wherein the heating is conducted in an escalating fashion so that the temperature at the top surface of the polyurethane foaming mixture in a first position within the region substantially matches the internal temperature of the foaming mixture in said first position within the region.

4. The method of claim 1, wherein heating is supplied by one or more heating sources selected from the group consisting of: radiant heat panels, heated gas, heat lamps, and combinations of such heating sources.

5. The method of claim 1, wherein heating is supplied by a heated gas blanket wherein the heated gas is primarily air.

6. The method of claim 1, wherein the chemically reactive polyurethane foaming mixture is conveyed along a conveying path and allowed to expand as it is conveyed.

7. The method of claim 6, wherein the region in which the foaming mixture is allowed to expand is maintained at atmospheric pressure.

8. The method of claim 6, wherein the region in which the foaming mixture is allowed to expand is maintained at a pressure below atmospheric pressure.

9. The method of claim 6, wherein the region in which the foaming mixture is allowed to expand is maintained at a pressure above atmospheric pressure.

10. The method of claim 6, wherein the foaming mixture is allowed to expand as it is conveyed along the conveying path for a predetermined distance before heat is applied to heat the top surface of the foaming mixture.

11. The method of claim 10, wherein the predetermined distance is about 20 feet.

12. An apparatus for producing a skinless or low skin flexible polyurethane foam slab, comprising:
   a dispensing device into which a chemically reactive polyurethane foaming mixture is introduced;
   a fall plate onto which the chemically reactive polyurethane foaming mixture is fed from the dispensing device;
   a conveyor for conveying the expanding foam away from the fall plate, said conveyor and fall plate together defining a conveying path along which the chemically reactive polyurethane foaming mixture is conveyed as it expands, wherein the chemically reactive polyurethane foaming mixture defines an internal temperature and defines a temperature at its top surface during its foaming expansion; and
   a heating source for heating at least a portion of a top surface of the chemically reactive polyurethane foaming mixture as the foaming mixture is conveyed along the conveying path, said heating source being mounted for tilting movement with relation to the conveying path.

13. The apparatus of claim 12, wherein the heating source comprising one or more heating sources selected from the group consisting of: radiant heat panels, heated gas, heat lamps, and combinations of such heating sources.

14. The apparatus of claim 13, wherein the heating source is a heated gas blanket wherein the heated gas is primarily air.

15. The apparatus of claim 12, wherein the heating source is positioned above the conveying path and at a distance spaced apart from the dispensing device.

16. The apparatus of claim 12, further comprising a means for controlling the pressure within a region enveloping the conveying path.

17. The apparatus of claim 16, wherein the means for controlling the pressure is a blower to draw gases out of the region so as to maintain the region below atmospheric pressure.

18. The apparatus of claim 16, wherein the means for controlling the pressure is a blower to force gases into the region so as to maintain the region above atmospheric pressure.

19. The apparatus of claim 12, wherein the heating source is capable of heating the top surface to a temperature in the range of about 230 to 260° F. (110 to 128° C.).

* * * * *